June 5, 1956
L. S. BILLMAN ET AL
2,748,565
OSCILLATING FUEL CONTROL FOR RAMJETS
AND METHOD OF OPERATING SAME
Filed July 19, 1952
3 Sheets-Sheet 1
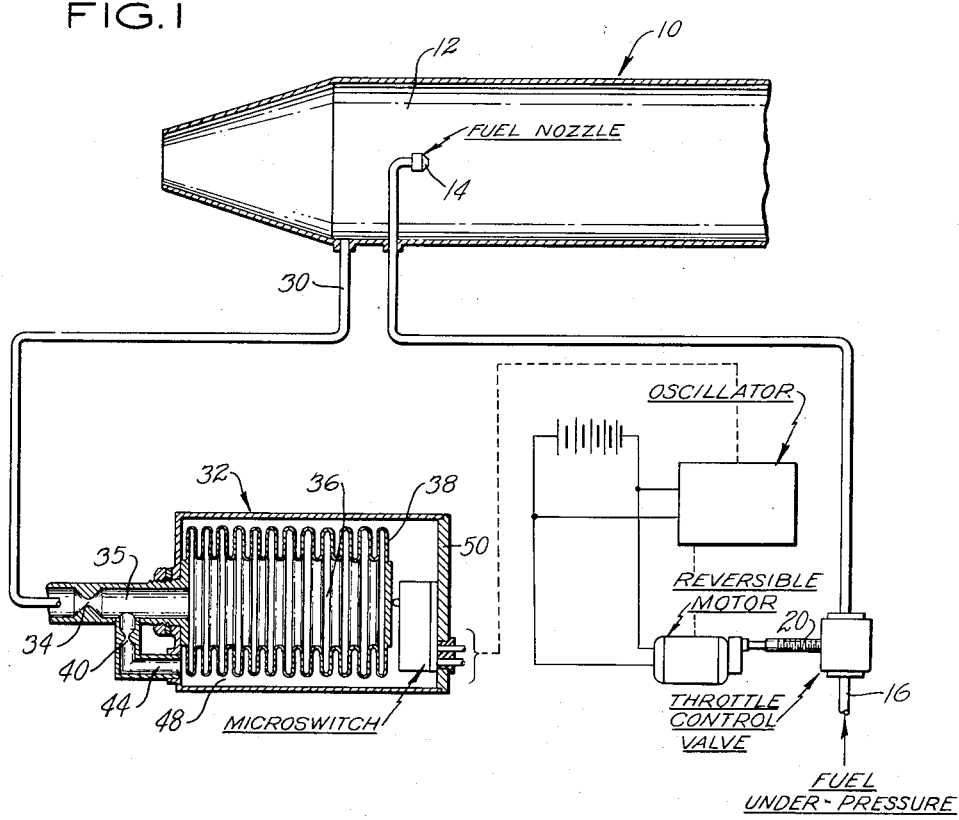
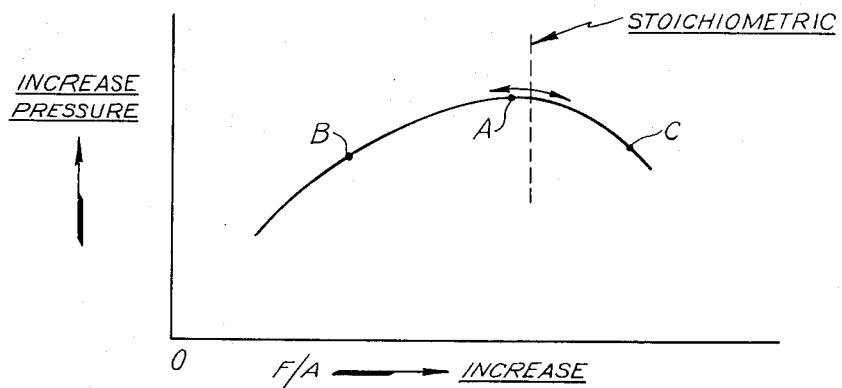
INVENTORS
LOUIS S. BILLMAN
ARTHUR C. ANGELOS
BY *Leonard F. Wedlind*
ATTORNEY

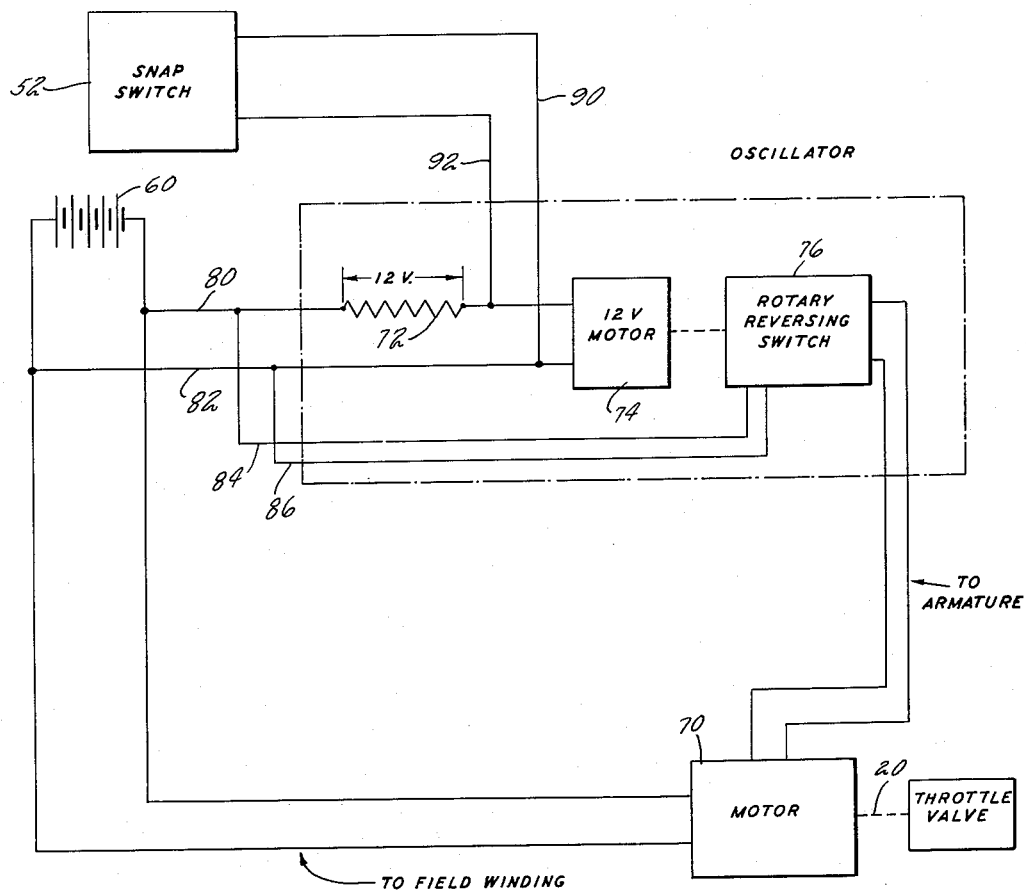

June 5, 1956   L. S. BILLMAN ET AL   2,748,565
OSCILLATING FUEL CONTROL FOR RAMJETS
AND METHOD OF OPERATING SAME
Filed July 19, 1952   3 Sheets-Sheet 3

INVENTORS
LOUIS S. BILLMAN
ARTHUR C. ANGELOS
BY *Leonard F. Wicklund*
ATTORNEY

United States Patent Office 2,748,565
Patented June 5, 1956

2,748,565

OSCILLATING FUEL CONTROL FOR RAMJETS AND METHOD OF OPERATING SAME

Louis S. Billman, Portland, and Arthur C. Angelos, Glastonbury, Conn., assignors to United Aircraft Corporation, East Hartford, Conn., a corporation of Delaware Application July 19, 1952, Serial No. 299,798

7 Claims. (Cl. 60—39.03)

This application is a continuation-in-part of application Serial No. 117,542, filed September 24, 1949, and now abandoned.

This invention relates to jet power plants and more particularly to fuel flow regulator means for burners of ramjet units.

It is an object of this invention to provide a regulator for a ramjet power plant which maintains the thrust output of the power plant at a maximum.

Another object of this invention is to provide a regulator for controlling the fuel flow into the burner of a ramjet engine which automatically maintains the pressure within the burner at a maximum.

Another object of this invention is to provide a fuel regulator for a ramjet burner which responds to variation of burner pressure to control the flow of fuel in an increasing or a decreasing direction to restore the burner pressure to a maximum.

A still further object of this invention is to provide a fuel regulator for a ramjet unit whereby the fuel flow to the burner is systematically varied in increasing and decreasing directions at a predetermined rate, the system being controllably modified in response to burner pressure variation to maintain the pressure and thrust of the ramjet at a maximum.

These and other objects will become readily apparent from the following detailed description of the drawings in which:

Fig. 1 is a schematic diagram in partial section indicating a portion of a ramjet unit and a regulator means according to this invention;

Fig. 1a is a wiring diagram illustrating the oscillator and associated elements;

Fig. 2 is a typical pressure curve for a ramjet unit indicating pressure variation over a range of fuel-air ratio values;

Figure 3:
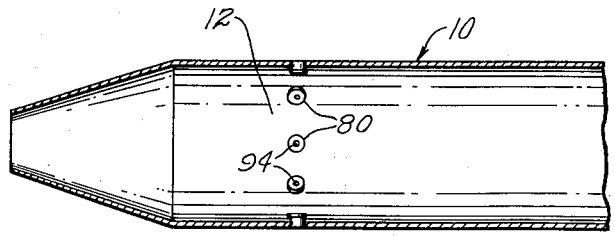
Fig. 3 is a partial cross section of a ramjet having a plurality of fuel injection nozzles which may be controlled for varying the fuel flow.

Inasmuch as the maximum thrust obtainable from a ramjet engine exists when the pressure in the burner is at a maximum, relative to the ambient atmosphere, it is desirable to control the thrust output as a function of the pressure in the burner. Usual fuel metering devices for ramjet units utilize a differential of free stream impact and static pressures to actuate the fuel regulator in an attempt to measure the weight of air flowing through the ramjet and thus provide the basis for a constant fuel-air ratio mixture to the burner. Normally this mixture is stoichiometric. Difficulties have been encountered in this method of metering fuel because the free stream impact and static pressure do not indicate the true airflow under conditions of detached shock, for example, and because a stoichiometric mixture does not always develop the maximum thrust available from the ramjet.

In other words, a maximum thrust is obtained from a ramjet when the maximum possible temperature rise occurs across the burner. Theoretically, this maximum temperature rise and the corresponding maximum pressure is obtained at a stoichiometric mixture. However, this is only true if the burner efficiency is independent of the fuel-air ratio and it has been found that burner efficiency varies with the fuel-air ratio so that peak efficiency may occur at a fuel-air ratio richer or leaner than stoichiometric depending upon the particular burner. Also, since burner efficiency varies with other operating conditions such as burner inlet velocity, pressure and so forth, the maximum temperature rise and thrust will occur at a fuel-air ratio somewhere between that at peak burner efficiency and stoichiometric conditions.

When the fuel-air ratio of a ramjet burner is varied from a lean to a rich mixture, the thrust increases until the maximum is obtained. Any further increase in fuel-air ratio will decrease the thrust. This variation of thrust is paralleled by a similar variation of static pressure in the burner duct as well as a variation in burner pressure drop. Therefore, it is desirable that a regulator be available which will control the fuel flow so that the maximum static pressure or burner pressure drop is maintained in order to produce the maximum thrust possible from the ramjet unit.

To this end, Fig. 1 illustrates a portion of a ramjet unit 10 having a burner section 12 wherein fuel is injected by means of a nozzle 14. Fuel under pressure is supplied via the line 16 to the nozzle 14 and the fuel flow is regulated by a throttle control valve. The control valve is actuated by a jackscrew 20 which in turn is operated by means of a reversible motor. An oscillator is placed in parallel with the field winding of the reversible motor and in series with the armature winding thereof so that the motor will be actuated in opposite directions at a predetermined frequency. The motor in turn by means of the jackscrew 20 actuates the throttle valve in flow increasing and decreasing directions at a frequency determined by the oscillator. It should be noted that the throttle valve regulates the flow of fuel so that it is always above a zero rate, i. e., the fuel is not cut off at anytime during the operation. The throttle valve may be of any well known type such that movement in one direction increases the fuel passage opening and vice versa.

A static pressure tap 30 is provided adjacent the burner section of the ramjet unit which communicates with a bellows type pressure responsive unit 32. A relatively large orifice 34 is provided at the entrance of the bellows unit 32 to meter the pressure flow entering the passage 35 and the inner chamber 36 of the bellows 38. A smaller orifice 40 in the passage 44 restricts the flow of fluid from the passage 35 into the chamber 48 which is formed by the case 50 and surrounds the outside of the bellows 38. The smaller orifice 40 prevents rapid changes in pressure in the chamber 48 outside the bellows 38, while the larger orifice 34 serves to protect the bellows 38 from extremely severe changes in pressure. A snap action switch is mounted inside the case 50 in a position to be engaged by the free end of the bellows 38. The switch 52 is normally open so that when an increase in pressure occurs within the chamber 36 the free end of the bellows closes the switch 52 so that the current may flow in a given direction to the armature of the reversible motor. Thus with the switch closed, the reversal of current normally induced by the oscillator will be disabled so that the motor will continue to operate in a given direction.

The oscillator may be of any known construction which can produce a systematic reversal of the direction of rotation of the reversible motor while also being capable of passing a current of a given polarity to cause the motor to continue to operate in any one of two directions. One method of producing this result is by means of the structure illustrated in Fig. 1a.

As shown herein, the battery 60, which may be of 24 volt capacity for example, is operatively connected to both the oscillator and the field winding of the reversible motor 70. The oscillator comprises, for example, a resistance 72 which can cause a 12 volt drop, a 12 volt motor 74 and a multi-pole reversing switch 76. The switch 76 may be of the rotary type and is driven by the motor 74.

The lines 80, 82 lead from the battery to the oscillator with the resistance being located in line 80 and both lines 80, 82 being connected to the motor 74. Lines 84, 86 lead from lines 80, 82 to supply the reversing switch with power and the reversing switch will continue to send current of a reversing polarity to the armature of the motor 70 at a frequency determined by the speed of the motor 74.

The snap action switch 52 is connected by lines 90, 92 in parallel with the motor 74. It is therefore apparent that when the switch 52 is closed the motor 74 will be shorted out thereby causing it to stop quickly. The reversing switch 76 will also stop in the instantaneous position it then holds. As a result, the current through the switch 76 will be of a given polarity so that the motor 70 will continue to rotate in a given direction. This condition obtains until the snap action switch 52 is opened following which the motor 74 and switch 76 will again operate to reverse the motor 70 at a predetermined frequency. It should be noted that the particular voltages mentioned are only by way of example and therefore voltages and resistances of any suitable proportions may be used.

In order to readily understand the principles involved in the regulator described above, reference is now made to Fig. 2 which illustrates the typical curve of the pressure within a ramjet burner as compared to fuel-air ratio variation. When the maximum pressure is being obtained in the ramjet, near stoichiometric conditions will exist and the pulsations of the oscillator, motor and fuel throttle valve will cause a high frequency but minute variation in the fuel-air ratio on either side of the maximum pressure point, for example, point A in Fig. 2. The maximum pressure point A normally is slightly on the lean or the rich side of the stoichiometric fuel-air ratio depending upon the type of burner utilized. Herein, point A, the maximum pressure point, is illustrated as being on the lean side of stoichiometric conditions. Since the slope of the pressure curve is relatively flat adjacent point A, the slight pressure variation which occurs on either side of point A as a result of the reversing pulsations of the throttle valve will be insufficient in magnitude to register through the orifice 34 and within chamber 36 of the bellows 38 so that the switch 52 will remain open. As stated above, the bellows 38 closes the switch only on a pressure increase. Thus at point A substantially steady maximum pressure is being obtained and as a result maximum thrust is being developed.

Assuming then that a disturbance such as a variation in pressure, entrance velocity or density has occurred and brought the burner pressure down to point B. Under this condition, then, the fuel-air ratio is too lean. Since the slope of the curve at this point is substantially greater than at point A the next instantaneous fuel increase oscillation of the throttle valve will cause the bellows 38 to expand and trip the switch 52 so that prior to the next fuel decrease surge which would ordinarily be produced by the oscillator, motor and valve, the oscillator will be disabled or its control paralyzed so that the fuel flow will continue to increase until maximum pressure (near point A) is again obtained. After the maximum pressure is reached the motor and valve still being on the fuel-air ratio increase movement, the pressure will then begin to drop as the fuel-air ratio moves past point A and the mixture becomes too rich. Immediately following this pressure drop the switch will open to again permit oscillation of the fuel flow and burner pressure at a mean position along the curve adjacent point A. It is to be understood that the response to burner pressure increase may have to be adjusted so that it is slightly out of phase with the oscillator frequency in order to operate the switch 52 within a desirable time interval before the normal time for motor reversal has elapsed. In this manner, the accuracy of the control will be greatly increased.

Under a condition of operation where the pressure in the burner has dropped along the curve to point C, for example, the fuel-air ratio will be too rich and the switch will then be closed at the next fuel decrease oscillation of the throttle valve since as the fuel flow is decreased in the vicinity of point C the pressure will begin to rise. Thus the oscillator will be disabled again on the fuel-air ratio decrease movement of the system so that the pressure will continue to rise until it reaches a value adjacent point A where further fuel flow decrease will cause a burner pressure decrease. In response to a burner pressure decrease the switch will open and the fuel flow and burner pressure will oscillate near the maximum pressure position where maximum thrust is again being developed.

Figure 4:
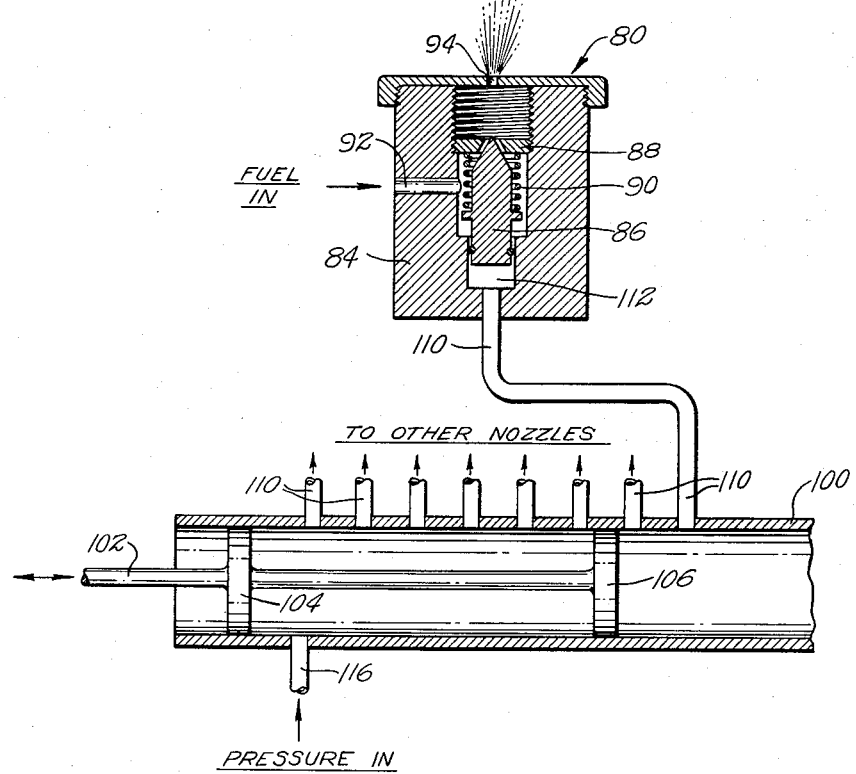
Fig. 4 is a cross-sectional view of a modified type of fuel control valve that may be utilized with this invention.

The nozzle 14 and the throttle valve of Fig. 1 may if desired be replaced by a plurality of peripherally spaced nozzles 80 shown in Fig. 3. To vary the fuel flow certain of these nozzles may be turned on and off by means of a control mechanism as shown in Fig. 4. Herein, each of the nozzles 80 comprise a housing 84 having a valve plunger 86 cooperating with a valve seat 88 and normally biased toward an open position by a spring 90 to permit fuel to flow through the passage 92 and out of the spray opening 94. A control valve 100 is provided having a reciprocable piston element 102 which includes a pair of lands 104 and 106. The valve 100 has a plurality of fluid connections 110 which communicate with the chamber 112 of each of the nozzles 80. Gas or liquid under pressure is also supplied to the valve 100 by means of a connection 116 so that by moving the piston element 102 to the left or right fluid under pressure from the connection 116 can be directed to any number of the nozzles. For example, if pressure were being supplied to the chamber 112 of the nozzle 80 shown in cross section, the plunger 86 would be moved against the bias of the spring 90 into a closed position against the valve seat 88 thereby cutting off the flow of fuel to the spray opening 94. Thus it is apparent that the piston element 102 of the control valve 100 could be operated by the jackscrew 20 of Fig. 1 to vary the flow of fuel to the ramjet burner.

In a ramjet missile or the like where nitrogen or similar gas under pressure is utilized to purge fuel from the tanks, such a pressure source would normally be used to supply fluid under pressure to the connection 116 of the control valve 100 (Fig. 4).

As a result of this invention it is apparent that a simple but accurate control means has been provided for maintaining a maximum thrust output for a ramjet burner regardless of the pressure, velocity and density conditions which are existent in the free airstream. This maximum pressure need not be determined, hence, regardless of the value of the peak pressure available the control unit will operate to maintain the pressure at such maximum.

Although certain embodiments of this invention have been illustrated and described herein, it is apparent that various changes and modifications of the construction and arrangement of the parts may be made without departing from the scope of this novel concept.

What it is desired to obtain by Letters Patent is:

1. In a power plant unit having air flowing therethrough, a burner, means for injecting fuel into said burner to mix with said air, means for varying the fuel flow in said injecting means, oscillating means for controlling said varying means in systematic flow increasing and decreasing directions including a source of power having predetermined impulse characteristics, and means responsive to an increase in pressure in said burner including operative connections to said control means for maintaining said control means in one of said directions until maximum pressure is obtained in said burner consistent with the mass of airflow.

2. In a ramjet unit having a flow of air therethrough, a burner, a source of fuel under pressure, means communicating with said source for injecting fuel into said burner to mix with the air, control means for systematically oscillating the flow of fuel from said source to said injection means in increasing and decreasing directions at a predetermined frequency, said fuel flow oscillations producing fluctuating pressures in said burner, the maximum of which pressure is dependent upon the mass air flowing through said unit, and regulator means responsive to a drop in pressure in said burner for paralyzing said control means in one of said directions to return said pressure to a maximum whereby said predetermined oscillating flow is again resumed.

3. In a hunting type fuel control for a ramjet engine, the engine having a burner section therein, means for supplying fuel to the engine, a throttle valve for regulating the flow of fuel, means for moving said valve in flow increasing and decreasing directions at a predetermined frequency including oscillator mechanism therefor, pressure responsive means having an operative connection to said burner section, fluid restrictor means within said connection, and means forming a part of said pressure responsive means comprising a bellows unit including an inner chamber subjected to the restricted fluid pressure from said burner section, means for bleeding off a portion of the restricted fluid to react externally of said bellows, and electro-mechanical means responsive to an increased pressure in said bellows for energizing said valve moving means for movement in only one of said flow directions until the pressure in said burner begins to decrease.

4. In a ramjet unit including a burner section, means for injecting fuel into the burner, oscillating means for sinusoidally controlling the flow of fuel in said injecting means above a zero value at predetermined pulses including a valve and a motor for operating said valve, and means responsive to a reduction in pressure in said burner below a predetermined value for varying the sinusoidal flow control to a unidirectional flow control to return the pressure substantially to said predetermined value including operative connections to said controlling means.

5. In a ramjet unit including a burner, means for injecting fuel into the burner, and means for regulating the flow of fuel to maintain the pressure in the burner at a maximum consisting of means for sinusoidally controlling the flow of fuel in said injecting means above a zero value including a drive having a predetermined pulsating rate, means for registering a change in static pressure in said burner, and means responsive to a positive registration in said registering means when the pressure is below the maximum to temporarily change the sinusoidal flow into a unidirectional flow variation until said pressure returns to a maximum.

6. In a ramjet unit having a flow of air therethrough, a burner, a source of fuel under pressure, means communicating with said source for injecting fuel into said burner to mix with the air, control means for systematically oscillating the flow of fuel from said source to said injection means in increasing and decreasing directions at a predetermined frequency, said fuel flow oscillations producing fluctuating pressures in said burner, the maximum of which pressure is dependent upon the mass air flowing through said unit, and regulator means responsive to a drop in pressure in said burner for paralyzing said control means in one of said directions to vary fuel flow in a unidirectional manner, said regulator means being operative to maintain said pressure at a maximum including a pressure responsive element having operative connections to said burner and control means.

7. In a method for maintaining the thrust and burner pressure of a ramjet unit at a maximum the steps comprising, regulating the flow of fuel to the burner in accordance with a fuel increasing and decreasing curve and at a predetermined frequency to induce fluctuation of fuel-air ratio in the burner, measuring changes in pressure in said burner, and unidirectionally increasing the fuel flow variation along the positive slope of the curve when a drop in burner pressure is due to a lean fuel-air ratio and unidirectionally increasing fuel flow variation along the negative slope of the curve when a drop in burner pressure is due to a rich fuel-air ratio.

References Cited in the file of this patent

UNITED STATES PATENTS

| | | |
|---|---|---|
| 2,545,815 | Klinge | Mar. 20, 1951 |
| 2,590,853 | Fulton | Apr. 1, 1952 |
| 2,606,420 | Moore | Aug. 12, 1952 |
| 2,650,471 | Knudsen | Sept. 1, 1953 |